(12) United States Patent
Hartmann et al.

(10) Patent No.: US 10,355,539 B2
(45) Date of Patent: Jul. 16, 2019

(54) COMPOSITE ELECTRIC MACHINE

(71) Applicant: Siemens Aktiengesellschaft, Munich (DE)

(72) Inventors: Ulrich Hartmann, Berlin (DE); Horst Kuemmlee, Berlin (DE); Axel Moehle, Berlin (DE); Peter Petereit, Berlin (DE); Marian Rakowicz, Schoenwalde-Glien (DE); Kurt Tischler, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 280 days.

(21) Appl. No.: 15/129,641

(22) PCT Filed: Mar. 13, 2015

(86) PCT No.: PCT/EP2015/055333
§ 371 (c)(1),
(2) Date: Sep. 27, 2016

(87) PCT Pub. No.: WO2015/144463
PCT Pub. Date: Oct. 1, 2015

(65) Prior Publication Data
US 2017/0179776 A1 Jun. 22, 2017

(30) Foreign Application Priority Data
Mar. 28, 2014 (EP) .................. 14162315

(51) Int. Cl.
*F03D 9/25* (2016.01)
*H02K 1/14* (2006.01)
(Continued)

(52) U.S. Cl.
CPC ............. *H02K 1/148* (2013.01); *F03D 9/25* (2016.05); *H02K 1/16* (2013.01); *H02K 3/32* (2013.01);
(Continued)

(58) Field of Classification Search
CPC  H02K 1/148; H02K 3/32; H02K 3/34; H02K 15/00; H02K 15/12; H02K 2213/12; H02K 1/16; F03D 9/25
(Continued)

(56) References Cited

U.S. PATENT DOCUMENTS

2007/0273236 A1 * 11/2007 Kaumann ............ H02K 3/28
                                                       310/179
2009/0091210 A1    4/2009 Bade et al.
(Continued)

FOREIGN PATENT DOCUMENTS

| CL | 2013001796 | 1/2014 |
| DE | 10306147 | 8/2004 |
(Continued)

*Primary Examiner* — Forrest M Phillips
(74) *Attorney, Agent, or Firm* — Cozen O'Connor

(57) ABSTRACT

A method for producing an annular active part of an electric machine, where the active part has ring segment-shaped sections with grooves for receiving electric conductors, an electric machine with the ring segment-shaped section, a mill with the electric machine, and a service method for such an electric machine or such a mill, and where the goal is to assembly the electric machine inexpensively.

19 Claims, 5 Drawing Sheets

(51) Int. Cl.
  *H02K 1/16*  (2006.01)
  *H02K 3/32*  (2006.01)
  *H02K 3/34*  (2006.01)
  *H02K 15/00*  (2006.01)
  *H02K 15/12*  (2006.01)

(52) U.S. Cl.
  CPC .............. *H02K 3/34* (2013.01); *H02K 15/00* (2013.01); *H02K 15/12* (2013.01); *H02K 2213/12* (2013.01); *Y02E 10/725* (2013.01)

(58) Field of Classification Search
  USPC .......................................................... 310/179
  See application file for complete search history.

(56) References Cited

U.S. PATENT DOCUMENTS

| | | | | |
|---|---|---|---|---|
| 2009/0179530 | A1* | 7/2009 | Neet | H02K 3/14 310/68 D |
| 2009/0206693 | A1* | 8/2009 | Calley | H02K 1/02 310/179 |
| 2011/0260467 | A1 | 10/2011 | Gudewer | |
| 2012/0133142 | A1 | 5/2012 | Langel | |
| 2012/0206009 | A1* | 8/2012 | Jang | H02K 3/522 310/179 |
| 2012/0286593 | A1 | 11/2012 | Yokogawa et al. | |
| 2012/0299434 | A1 | 11/2012 | Hartmann et al. | |
| 2012/0319512 | A1 | 12/2012 | Nakagawa | |
| 2013/0127287 | A1* | 5/2013 | Stephenson | H02K 15/0478 310/179 |
| 2014/0285052 | A1* | 9/2014 | Tomohara | H02K 3/12 310/179 |
| 2015/0137653 | A1* | 5/2015 | Petereit | H02K 1/18 310/216.113 |
| 2018/0205301 | A1* | 7/2018 | Didier | H02K 16/04 |

FOREIGN PATENT DOCUMENTS

| | | | |
|---|---|---|---|
| DE | 102009030727 | 12/2010 | |
| DE | 10318816 | 11/2012 | |
| DE | 102011088660 | 6/2013 | |
| DE | 102012202735 | 8/2013 | |
| EA | 016623 | 6/2012 | |
| EP | 2166644 | 3/2010 | |
| EP | 2790299 A2 * | 10/2014 | ............. H02K 1/148 |
| RU | 2395887 | 7/2010 | |
| RU | 2506682 C2 | 2/2014 | |
| RU | 2012137714 | 3/2014 | |
| UA | 38771 | 1/2009 | |
| WO | WO 2011/006809 | 1/2011 | |

* cited by examiner

COMPOSITE ELECTRIC MACHINE

CROSS-REFERENCE TO RELATED APPLICATIONS

This is a U.S. national stage of application No. PCT/EP2015/055333 filed 13 Mar. 2015. Priority is claimed on European Application No. 14162315.7 filed 28 Mar. 2014, the content of which is incorporated herein by reference in its entirety.

BACKGROUND OF THE INVENTION

1. Field of the Invention

The invention relates to a method for producing an annular active part of an electric machine for a mill drive or a wind power plant, where the active part includes ring-segment-shaped sections with grooves for receiving electric conductors. The invention further relates to such a ring-segment-shaped section, an electric machine comprising such a section for a mill drive or a wind power plant, and a mill or a wind power plant comprising such an electric machine, and lastly the invention relates to a service method for such an electric machine or such a mill or such a wind power plant.

2. Description of the of the Related Art

An annular active part of an electric machine having ring-segment-shaped sections, an electric machine, a mill or a wind power plant comprising such an electric machine and/or a service method are used in the context of comparatively large electric machines having an electric power of 1 MW and more. As a result of logistical restrictions, such machines can often no longer be transported as complete units, but must instead be divided into segments. The assembly then occurs at the installation site. In this case, electrical connection of the segments part is necessary.

The electrical connection of the segments part can be achieved technically via "hinged coils", for example, where one or more coils are installed across segment boundaries, electrically connected and optionally insulated at the installation site. These tasks are very time intensive and therefore significantly increase the commissioning time and costs of the electric motor.

DE 10 2011 088 660 A1 discloses an electric machine and a method for its production. The electric machine comprises a housing, a stator that is arranged in the housing, and a rotor that is rotatably arranged within the stator, where the housing comprises at least two housing segments and the stator at least two stator segments, and where each of the stator segments can be individually fixed to one of the housing segments via at least one mechanically detachable connection.

DE 10 2012 202 735 A1 discloses a dynamoelectric machine having a stator which, viewed in a circumferential direction, comprises a plurality of segments, where together these forming the stator.

SUMMARY OF THE INVENTION

It is an object of the present invention to provide an economical way of assembling an electric machine for a mill drive or a wind power plant, to provide an electric machine which can be assembled in an economical way for a mill drive or a wind power plant, and to maintain or repair such an electric machine in an economical way.

These and other objects and advantages are achieved in accordance with the invention by a method having the steps of forming sections comprising the grooves, providing at least two, preferably three, galvanically separated electric conductors in each case, where each electric conductor is configured such that it can be arranged in at least two different grooves of the respective section, running in opposite directions, insulating the respective electric conductor by a respective electrically insulating insulation layer, impregnating the respective insulation layer of the respective electric conductor with an impregnant, inserting the respective insulated and impregnated electric conductor into the at least two different grooves of the respective section, electrically connecting the respective electric conductor of the respective section to a respective section conductor rail before the transportation of the respective section, in such a way that the respective section can be operated by suitably applying a voltage to the respective section conductor rail, transporting the respective section, including the respective electric conductors inserted therein, to an assembly location and/or operating location of the electric machine, and assembling the annular active part by joining at least two of the sections with the aid of at least one respective connection.

It is also an object of the invention to provide a ring-segment-shaped section in which the section has grooves for receiving electric conductors, at least two, preferably three, galvanically separated electric conductors, a respective electrically insulating insulation layer, and a respective section conductor rail, which electrically insulates the respective electric conductor, where the respective insulation layer of the respective electric conductor is impregnated with an impregnant, where the respective insulated and impregnated electric conductor is arranged in at least two different grooves of the respective section, running in opposite directions, and where the respective section conductor rail is electrically connected to the respective electric conductor of the respective section before the transportation of the respective section such that the respective section can be operated by suitably applying a voltage to the respective section conductor rail.

It is a further object of the invention to provide an electric machine comprising such a section, and a mill or a wind power plant comprising such an electric machine. Here, the mill is preferably configured to grind rock-like bulk materials.

A ring-segment-shaped embodiment of a component is present if, for example, the radial inside of the component approximately represents a section of an inner surface of a cylindrical shell or if the component approximately represents a circular arc.

The at least two galvanically separated electric conductors can each be formed as a litz winding, for example. Provision is preferably made for three galvanically separated electric conductors, such that the respective section or the electric machine can be operated with three phases u, v and w. The respective electric conductor is inserted into at least two different grooves of the respective section, where the respective grooves preferably extend in an axial direction and the respective electric conductor is guided in an axial direction, at least once from one axial end face of the section or the assembled electric machine to the other axial end face and at least once back again. Such a respective electric conductor forms a magnetic pole when the respective section or the electric machine is operated. It is also conceivable for the respective electric conductor to be guided twice or more back-and-forth in an axial direction.

Even before the respective electric conductor is inserted into the respective grooves, it is insulated by an insulation layer that encloses the respective conductor, preferably with the exception of at least two respective connection points. The thus insulated respective electric conductor and the associated insulation layer is then impregnated with an impregnant via vacuum pressure impregnation (VPI), for example. The insulated and impregnated respective electric conductor is then inserted into the corresponding grooves of the section. These work stages are preferably all performed on the same premises, e.g., at a factory for producing electric motors or generators.

By contrast, the electric machine is assembled and/or operated at a different location, i.e., the assembly location and/or operating location. The electric machine is, e.g., an electric motor that is used as a mill drive, or a generator that is used in a wind power plant. In this case, the electric machine can preferably be used with an electric power of more than 1 MW, in particular more than 10 MW, where the electric machine particularly has an air gap diameter of at least 1 m, preferably more than 5 m or 10 m, between a stator and a rotor. In particular, such electric machines cannot be completely assembled at one location and transported to their respective operating locations only after they have been completely assembled.

After the respective insulated and impregnated electric conductor has been inserted into the respective grooves of the respective section, the respective section including the electric conductors situated therein is transported to the assembly location and/or the operating location of the electric machine. The assembly location and the operating location are normally the same in the case of mills, for example, where in the particular case of wind power generators, it is possible for the operating location to be in the nacelle of the respective wind power plant while the wind power generator in particular is assembled on the ground in the vicinity of the wind power plant.

The assembly of the annular active part is finally effected by joining at least two of the sections with the aid of at least one respective connection in this case. In principle, it is conceivable for two adjacent sections to be connected together directly by the connection. Alternatively or additionally, at least two of the sections may be joined together via a supporting framework of the active part or the electric machine such that the respective section is connected to the supporting framework by a respective connection, thereby forming the annular active part, where the sections likewise are finally joined. The respective connection is preferably configured to be mechanically detachable, in particular as a screw connection.

The method and ring-segment-shaped section in accordance with the invention allows the respective section to be fully produced, insulated, impregnated and electrically already tested at the production facility. This has the advantage, for example, that in particular the work stages of the insulation, the impregnation and the testing can be performed in an automated manner, thereby helping to prevent connection errors and associated overvoltage problems and also to reduce costs. Moreover, by virtue of their insulation and impregnation, the respective electric conductors of the fully produced section are practically self-contained and consequently particularly well protected against soiling and humidity. As a result, damage during transportation to the assembly location and/or operating location of the electric machine can be limited or avoided. The assembly costs of the electric machine at the assembly location or installation site, usually therefore at the operating location of the electric machine, are also significantly reduced. Furthermore, the proportion of identical parts of an electric machine can be increased if the winding system is divided into a larger number of sections. For large electric motors or generators having an air gap diameter of several meters in particular, this reduces the lead time between receipt of order and commissioning of the machine, thereby again allowing a reduction in costs.

The method and section in accordance with the invention likewise significantly reduce the risk of a faulty implementation of the winding system, e.g., due to assembly faults or insulation faults. In this case, the respective electric conductor of the respective section is electrically connected to a respective section conductor rail before the transportation of the respective section or during the assembly of the active part, such that the respective section can be operated by suitably applying a voltage to the respective section conductor.

For example, the respective section conductor rail can be formed as a copper or steel part having a rectangular cross section in particular, where an embodiment in the form of a cable or insulated cable is likewise conceivable. The concept of the conductor rail in the present disclosure is understood to signify that no individual electrical connection between only two individual electric conductors or subconductors is made, e.g., as occurs when implementing a connection in series of two electric conductors or subconductors.

The respective electric conductor is electrically connected to the respective section conductor rail even before the transportation of the respective section, thereby allowing a reduction in the assembly costs at the assembly location and/or operating location of the electric machine. It is thereby again possible to save costs and avoid errors when making the electrical connections. As a result of using the aforementioned conductor rails, the assembly costs are relatively low, particularly in comparison with individual connection of the individual electric conductors or subconductors.

The respective electric conductors and respective section conductor rails are therefore formed and connected together such that the respective section can be operated by suitably applying a voltage to the respective section conductor rail. The active part can therefore be constructed in a modular manner, thereby allowing e.g. partial load operation in which only some of the sections are operated.

In an advantageous embodiment of the invention, the respective section conductor rail is directly connected to the respective connection point of the electric machine during the assembly of the active part in this case.

For example, the respective connection point of the electric machine is understood to be a respective contact point in a terminal box of the electric machine, where the terminal box is connected to the public electricity network or to a voltage system converter, for example. Electrical energy is therefore supplied to or from the electric machine via the respective connection point, in accordance with whether the electric machine is operated as a motor or a generator.

The direct connection of the respective section conductor rail to the respective connection point has the advantage that the assembly costs at the assembly location and/or operating location are very low. Moreover, the direct connection has the additional advantage that partial load operation of the respective section or the electric machine is possible because the respective sections of the electric machine can be operated independently of each other. The possibility of partial load operation allows relatively high availability, which is extremely important in the particular case of mills.

Such partial load operation is desirable, e.g., if at least one of the sections of the electric machine is faulty and/or if no electrical energy can be supplied to or from the section. The latter case occurs, e.g., if various sections of the electric machine are connected to different voltage system converters and one of the voltage system converters is faulty, such that the section or sections connected to the faulty voltage system converter cannot be operated.

In a further advantageous embodiment of the invention, the annular active part includes at least two, preferably four, ring-segment-shaped segments, where at least two of the sections are connected to a respective segment by a respective connection during assembly of the active part.

The totality of the segments can be understood to be the aforementioned supporting framework, for example. During the assembly of the active part, for example, all of the segments of the active part are initially brought together and in particular connected together by connections. The respective sections can then be connected to the respective segment by a respective connection.

The segments are each connected to at least two sections by a respective connection, where three or more sections are preferably provided per segment. By virtue of the segments and the respective connection of the respective section to a respective segment, the assembly of the active part at the assembly location and/or operating location of the electric machine is further simplified. In addition, this embodiment of the electric machine makes it particularly easy to replace a faulty section. The respective connection is preferably configured to be mechanically detachable.

In a further advantageous embodiment of the invention, the respective electric conductor of the respective section is electrically connected to a respective segment conductor rail during the assembly of the active part in this case, such that the electric conductors of the respective segment can be operated by suitably applying a voltage to the respective segment conductor rail.

As a result of using a respective segment conductor rail, the assembly costs at the assembly location and/or operating location of the electric machine can be kept to a relatively low level while, nonetheless, allowing comparatively simple electrical wiring of the complete active part.

In a further advantageous embodiment of the invention, the respective section conductor rail is connected to the respective segment conductor rail during the assembly in this case.

The respective section conductor rail is preferably connected to the respective segment conductor rail by a respective connection that is in particular mechanically detachable. This involves relatively low assembly costs and at the same time allows simple repair and/or replacement of a faulty section in particular.

In an alternative advantageous embodiment of the invention, the respective section conductor rail, in this case, is formed as a unitary part with the respective segment conductor rail. Such an embodiment of the respective segment conductor rail and the respective section conductor rail simplifies the assembly and therefore reduces the costs associated with the commissioning, where repair and/or replacement of a faulty section in particular are also facilitated.

In a further advantageous embodiment of the invention, the respective segment conductor rail is directly connected to the respective connection point of the electric machine during assembly.

The active part can therefore be constructed in a modular manner, thereby allowing, e.g., partial load operation in which only some of the segments are operated. The direct connection of the respective segment conductor rail to the respective connection point has the advantage that the assembly costs at the assembly location and/or operating location are very low. Moreover, the direct connection has the additional advantage that partial load operation of the respective segment or the electric machine is possible because the respective segments of the electric machine can be operated independently of each other. The possibility of partial load operation allows relatively high availability, which is extremely important in the particular case of mills.

In a further advantageous embodiment of the invention, the respective electric conductors of at least two different segments are connected together via the respective section conductor rail or via the respective segment conductor rail during the assembly of the active part, where the respective section conductor rail or the respective segment conductor rail is connected to the respective connection point of the electric machine during the assembly.

In a further advantageous embodiment of the invention, the at least two electric conductors are formed such that at least two, preferably three, magnetic poles are formed when a voltage is suitably applied to the respective electric conductor.

The electric conductors of the respective section are preferably configured so that a corresponding application of a voltage results in the formation of at least two, preferably three, magnetic poles, these being offset relative to each other in a circumferential direction. In particular, the respective section can be configured so that the respective section has separate electric conductors in each case for the three phases u, v and w, and that the respective section develops at least two, preferably three, magnetic poles for the three phases respectively when a voltage is suitably applied.

In a further advantageous embodiment of the invention, the respective electric conductor is configured as a preformed coil, where at least one of the electric conductors is cranked outwards in a radial direction and/or at least one of the electric conductors is cranked inwards in a radial direction.

As a result of cranking the respective electric conductor in this manner, it is possible to achieve a relatively compact axial embodiment of the respective section and hence of the annular active part. In particular, provision can be made for one of the electric conductors to be cranked radially outwards or inwards by 40-45°, for example, and another of the electric conductors to be cranked radially outwards or inwards by 80-90°.

It is a further object of the invention to provide a service method having the steps of providing at least one ring-segment-shaped section, in addition to the ring-segment-shaped sections of the electric machine, in the vicinity of the operating location of the electric machine, where the at least one additionally provided section is essentially structurally identical to the ring-segment-shaped sections of the electric machine, and if one of the ring-segment-shaped sections of the electric machine exhibits a fault, then the faulty section is removed from the electric machine, and the at least one additionally provided section is installed within the electric machine.

By virtue of the respective connection of the respective section to the remainder of the active part or the remainder of the electric machine, a faulty section can be removed very easily. Moreover, the respective conductor rail is preferably also connected to the respective electric conductor of the section concerned by a connection. The respective connection is preferably configured to be mechanically detachable.

The active part of the electric machine preferably includes at least twelve sections, which divide into four segments in particular, such that the individual sections are relatively small in comparison with the overall electric machine. Not only do the production costs of the individual section decrease as a result of comparatively small sections, but the capital investment in stocking an additional section is also lower.

In this case, the additional section is provided in the vicinity of the operating location of the electric machine, where the vicinity particularly relates to a machine hall or premises in or at which the electric machine is operated. In the example of a wind power park comprising a plurality of wind power plants, the cited vicinity may be rather larger and include, for example, a central converter station of the wind power park, such that the additional section is stored at the central converter station, for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described and explained in greater detail below with reference to the exemplary embodiments illustrated in the figures, in which.

DETAILED DESCRIPTION OF THE EXEMPLARY EMBODIMENTS

Figure 1:
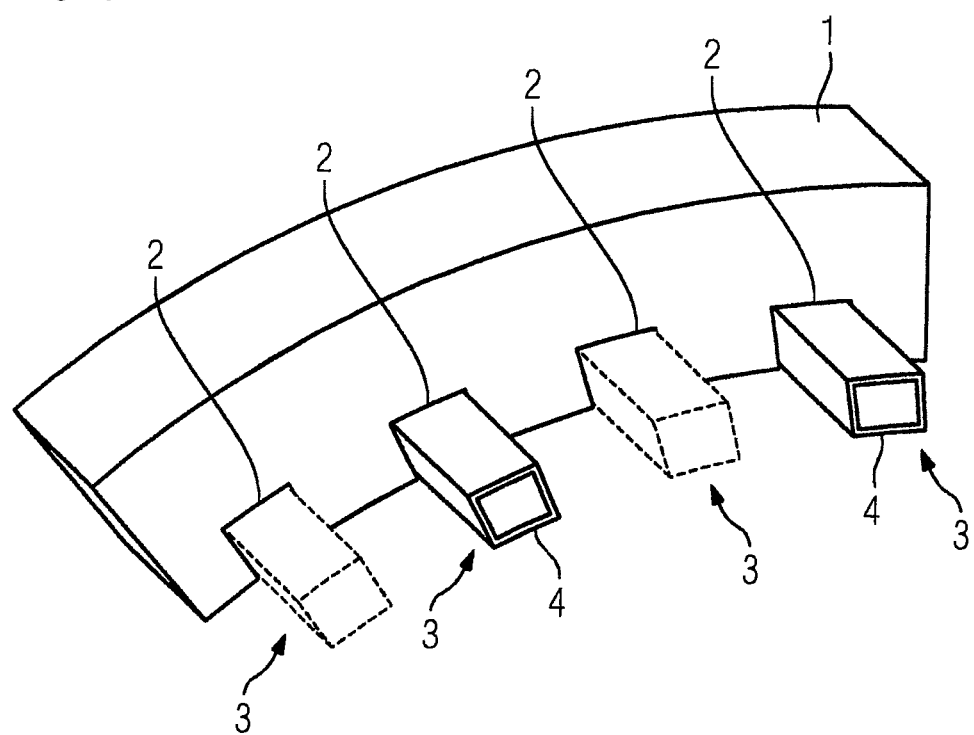
FIG. 1 shows an exemplary ring-segment-shaped section in accordance with the invention.

FIG. 1 shows an exemplary ring-segment-shaped section 1. The section 1 includes a plurality of grooves 2 in which electric conductors 3 are arranged, these being galvanically separated from each other. Here, broken and continuous lines are used to illustrate a first and second electric conductor 3 respectively, each of which is arranged so as to extend in opposite directions in two different grooves 2. In this case, the respective electric conductor 3 is insulated by an electrically insulating insulation layer 4, where the respective insulation layer 4 is impregnated with impregnant. The insulation and impregnation of the respective electric conductor 3 is effected before the respective electric conductor 3 is inserted into the respective groove 2.

A plurality of such sections 1 including the respective electric conductors 3 inserted therein can be transported to an assembly location and/or operating location of an electric machine, where they can then be assembled by joining a plurality of sections 1 with the aid of a respective connection to form an annular active part of the electric machine.

Figure 2:
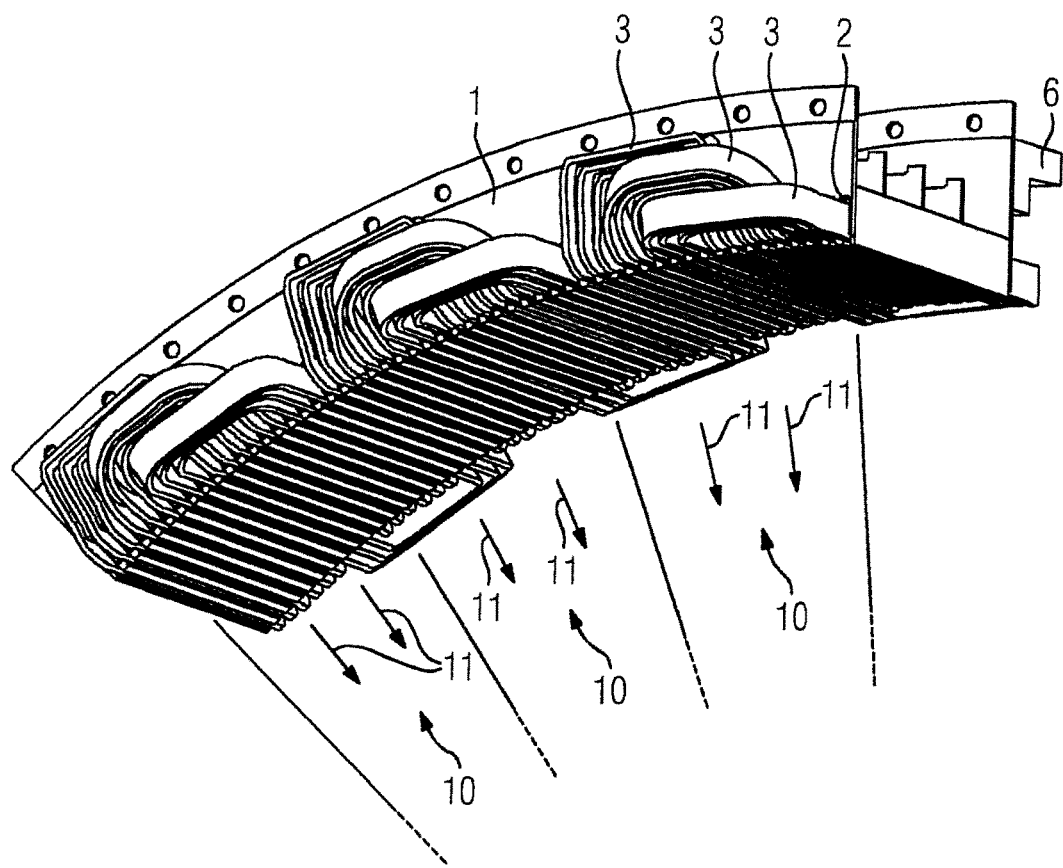
FIG. 2 shows an exemplary ring-segment-shaped section in accordance with the invention.

FIG. 2 shows an exemplary embodiment of a ring-segment-shaped section 1 in accordance with the invention. Here, reference signs identical to those in FIG. 1 denote identical items.

The section 1 with its electric conductors 3 is configured so that three magnetic poles 10 can be formed by suitably applying a voltage to the electric conductors 3, such that magnetic field lines 11 directed radially inwards are generated as illustrated in FIG. 2, for example. Three electric conductors 3 corresponding to the three phases u, v and w are provided for each region of the section 1 which can form a magnetic pole 10. Here, the section 1 or the electric conductor 3 of each phase is configured such that the respective conductor 3 is arranged in the grooves 2 so as to extend three times in one axial direction and three times in the opposite direction. Furthermore, the electric conductors 3 of two of the three phases of the respective region comprising a magnetic pole 10 are cranked radially outwards, where one of these two conductors 3 is cranked by approximately 40-45° and the other of these two conductors is cranked by approximately 80-90°.

The electric conductors 3 are each connected to a section conductor rail 6, which is merely indicated in FIG. 2. A separate conductor rail 6 is preferably provided at least for each of the three phases u, v and w. The respective section conductor rail 6 can be connected to corresponding section conductor rails 6 of other sections 1, for example, and/or directly to the connection points of a terminal box of the electric machine, for example. Here, the respective connection between the respective electric conductor 3 and the respective section conductor rail 6 is preferably configured to be mechanically detachable.

Figure 3:
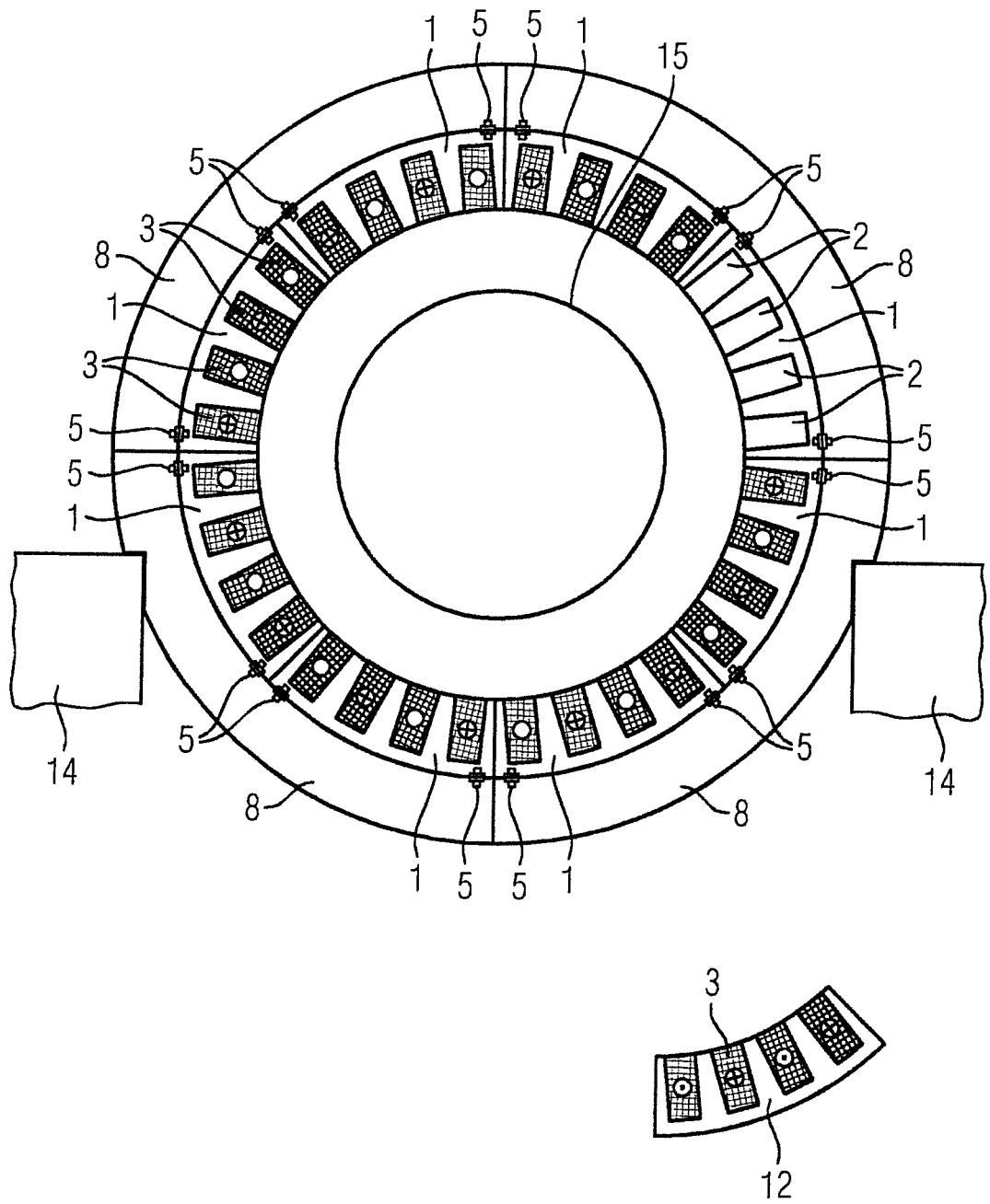
FIG. 3 shows an exemplary embodiment of an electric machine in accordance with the invention.

FIG. 3 shows an exemplary embodiment of an electric machine in accordance with the invention, where the electric machine may be formed as a mill drive or a mill, for example. Some details in the illustration of the electric machine have been omitted for the sake of clarity.

The electric machine has four segments 8 in total, which function as a type of supporting framework and are all mounted on bases 14. Each of the segments 8 is connected to two sections 1 via connections 5. Therefore, the sections 1 together form an annular active part, where the segments 8 perform a supporting function. A rotatably mounted rotor 15 that is connected in a non-rotatable manner to a grinding drum, for example, is arranged within the active part.

Each of the sections 1 has a respective section conductor rail 6, which is not illustrated in further detail in FIG. 3. Here, the respective section rail 6 can be directly connected to a respective connection point, e.g., in a terminal box, of the electric machine or to other section conductor rails 6 or segment conductor rails, where respective connections are preferably used for this purpose.

In addition to the sections 1 of the electric machine, an additional section 12 is provided in the vicinity of the operating location of the electric machine. In the event that one of the sections 1 of the electric machine exhibits a fault, the faulty section 1 is removed from the electric machine and the additionally provided section 12 is installed into the electric machine.

In summary, the disclosed embodiments of the invention relate to a method for producing an annular active part of an electric machine for a mill drive or a wind power plant, where the active part includes ring-segment-shaped sections comprising grooves for receiving electric conductors. The invention further relates to such a ring-segment-shaped section for a mill drive or a wind power plant, an electric machine comprising such a section, and a mill comprising such an electric machine, and lastly relates to a service method for such an electric machine or such a mill.

In order to provide an economical way to assemble an electric machine, to provide an electric machine which can be assembled in an economical way, and to maintain or repair such an electric machine in an economical way, the method inter alia includes the following steps of forming sections comprising the grooves, providing at least two, preferably three, galvanically separated electric conductors in each case, where each electric conductor is configured such that it can be arranged in at least two different grooves of the respective section, extending in opposite directions, insulating the respective electric conductor by a respective electrically insulating insulation layer, impregnating the respective insulation layer of the respective electric conductor with an impregnant, inserting the respective insulated and impregnated electric conductor into the at least two different grooves of the respective section, electrically connecting the respective electric conductor of the respective section to a respective section conductor rail before the transportation of the respective section, in such a way that the respective section can be operated by suitably applying a voltage to the respective section conductor rail, transporting the respective section, including the respective electric conductors inserted therein, to an assembly location and/or operating location of the electric machine, and assembling the annular active part by joining at least two of the sections with the aid of at least one respective connection.

It is further proposed that the section should have grooves for receiving electric conductors, at least two, preferably three, galvanically separated electric conductors, a respective electrically insulating insulation layer, and a respective section conductor rail, where the respective insulation layer electrically insulates the respective electric conductor, wherein the respective insulation layer of the respective electric conductor is impregnated with an impregnant, where the respective insulated and impregnated electric conductor is arranged in at least two different grooves of the respective section, extending in opposite directions, and where the respective section conductor rail is electrically connected to the respective electric conductor of the respective section before the transportation of the respective section, in such a way that the respective section can be operated by suitably applying a voltage to the respective section conductor rail.

The disclosed embodiments of the invention additionally relates to an electric machine comprising such a section and a mill comprising such an electric machine.

Lastly, the disclosed embodiments relate to a service method having the steps of providing at least one ring-segment-shaped section, in addition to the ring-segment-shaped sections of the electric machine, in the vicinity of the operating location of the electric machine, where the at least one additionally provided section is essentially structurally identical to the ring-segment-shaped sections of the electric machine, and if one of the ring-segment-shaped sections of the electric machine exhibits a fault, then the faulty section is removed from the electric machine, and the at least one additionally provided section is installed within the electric machine.

Figure 4:
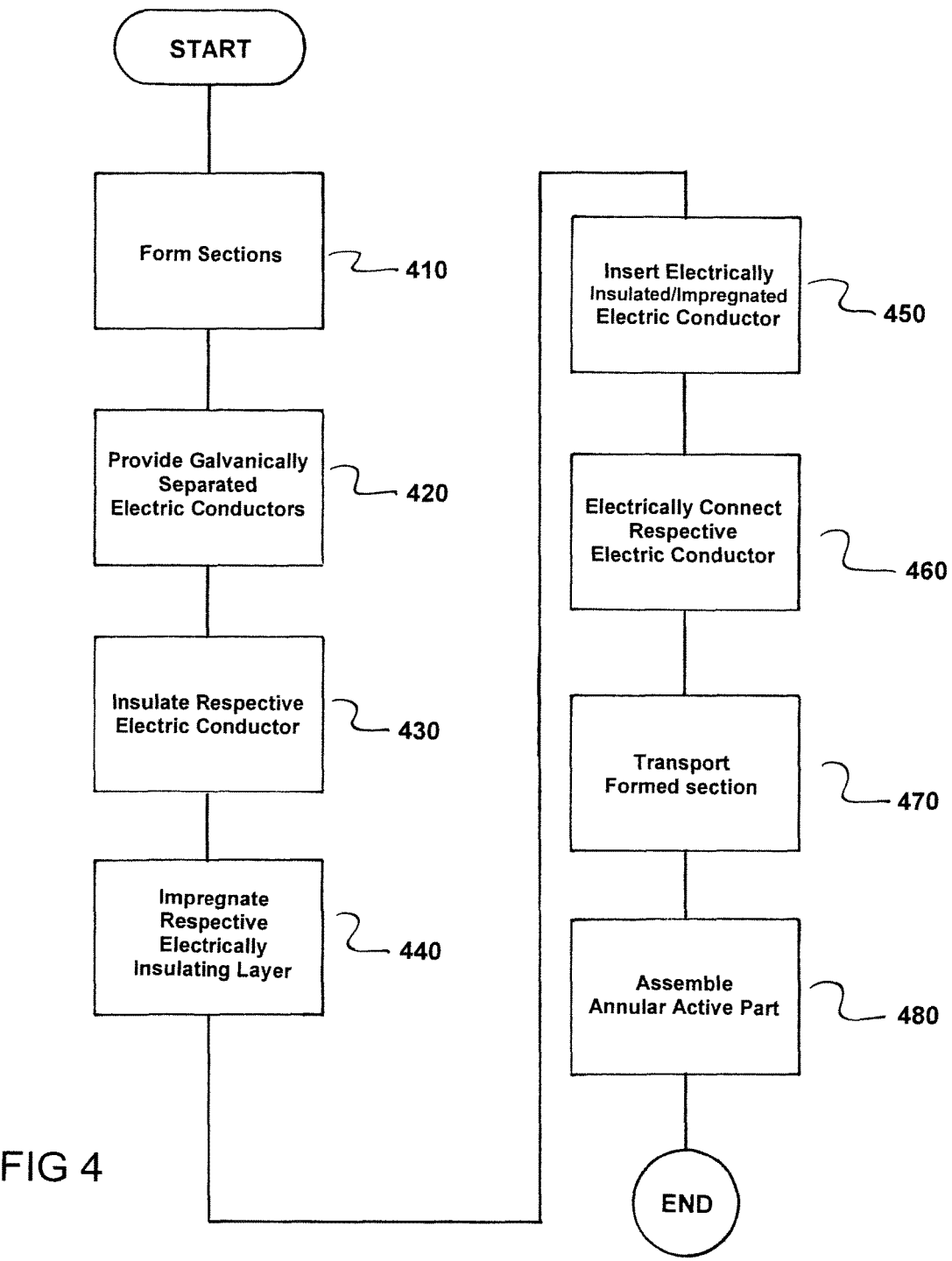
FIG. 4 is a flowchart of the method in accordance with the invention.

FIG. 4 is a flowchart of a method for producing an annular active part of an electric machine for a mill drive or a wind power plant, the active part including ring-segment-shaped sections (1) comprising grooves (2) for receiving electric conductors (3). The method comprises forming sections (1) comprising the grooves (2), as indicated in step 410.

Next, at least two galvanically separated electric conductors (3) are provided in each case, as indicated in step 420. Here, each electric conductor (3) is configured to be arranged in at least two different grooves (2) of a respective formed section (1), extending in opposite directions.

A respective electric conductor (3) is now insulated via a respective electrically insulating insulation layer (4), as indicated in step 430.

Next, the respective electrically insulating insulation layer (4) of each respective electric conductor (3) is impregnated with an impregnant, as indicated in step 440.

The respective electrically insulating insulated and impregnated electric conductor (3) are now inserted into the at least two different grooves (2) of the respective section (1), as indicated in step 450.

Next, the respective electric conductor (3) of the respective formed section (1) is electrically connected to a respective section conductor rail (6) before the transportation of the respective formed section (1) such that the respective formed section (1) is operable by applying a voltage to the respective section conductor rail (6), as indicated in step 460.

transporting the respective formed section (1), including the respective electric conductors (3) inserted therein, to at least one of an assembly location and an operating location of the electric machine, as indicated in step 470.

The annular active part of the an electric machine is now assembled by joining at least two of the ring-segment-shaped sections (1) comprising grooves (2) aided by at least one respective connection (5), as indicated in step 480.

Figure 5:
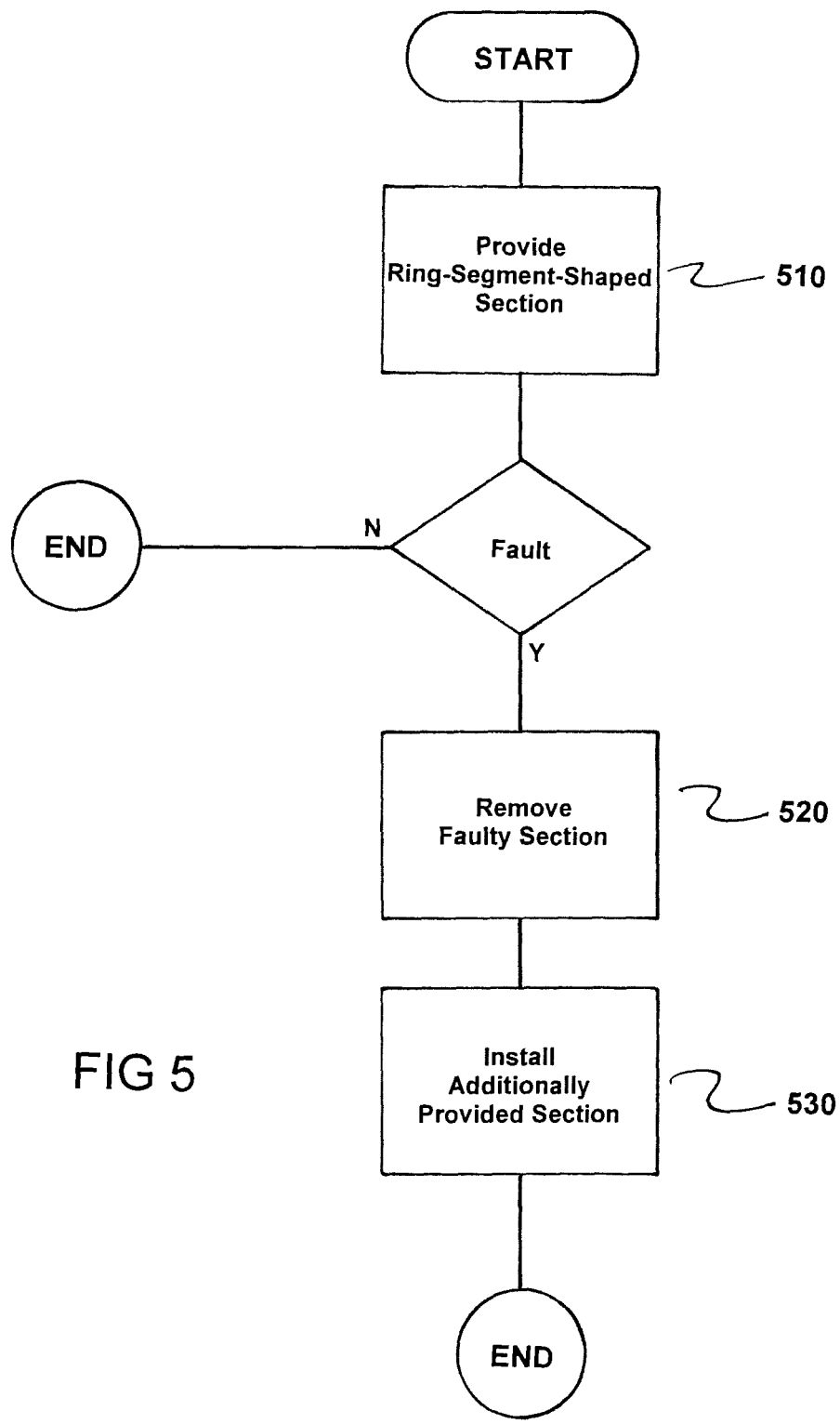
FIG. 5 is flowchart of a service method for an electric machine for a mill drive or a wind power plant in accordance with the invention.

FIG. 5 is a flowchart of a service method for an electric machine for a mill drive or a wind power plant, The method comprises providing at least one ring-segment-shaped section (12), in addition to ring-segment-shaped sections (1) of the electric machine, in a vicinity of an operating location of the electric machine, as indicated in step 510. Here, the at least one additionally provided section (12) is essentially structurally identical to the ring-segment-shaped sections (1) of the electric machine.

Next, if one of the ring-segment-shaped sections (1) of the electric machine exhibits a fault, then the faulty section (1) is removed from the electric machine, and the at least one additionally provided section (12) is installed within the electric machine, as indicated in step 520.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those element steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A method for producing an annular active part of an electric machine for a mill drive or a wind power plant, the annular active part surrounding ring-segment-shaped sections comprising grooves for receiving electric conductors, the method comprising:

forming the ring-segment-shaped sections comprising the grooves;

providing at least two galvanically separated electric conductors in each case, each electric conductor being configured to be arranged in at least two different grooves of a respective formed ring-segment-shaped section, extending in opposite directions;

insulating a respective electric conductor via a respective electrically insulating insulation layer;

impregnating the respective electrically insulating insulation layer of each respective electric conductor with an impregnant;

inserting the respective electrically insulated and impregnated electric conductor into the at least two different grooves of the respective formed ring-segment-shaped section;

electrically connecting the respective electric conductor of the respective formed ring-segment-shaped section to a respective section conductor rail before the transportation of the respective formed ring-segment-shaped section such that the respective formed ring-segment-shaped section is operable by applying a voltage to the respective section conductor rail;

transporting the respective formed ring-segment-shaped section, including the respective electric conductors inserted therein, to at least one of an assembly location and an operating location of the electric machine; and assembling the annular active part of the electric machine by joining at least two of the ring-segment-shaped sections comprising grooves aided by at least one respective connection.

2. The method as claimed in claim 1, wherein the respective section conductor rail is directly connected to a respective connection point of the electric machine during assembly of the annular active part.

3. The method as claimed in claim 1, wherein the annular active part includes at least two ring-segment-shaped segments; and wherein at least two of the ring-segment-shaped sections are connected to a respective segment via a respective connection during assembly of the annular active part.

4. The method as claimed in claim 3, wherein the respective electric conductor of the respective ring-segment-shaped section is electrically connected to a respective segment conductor rail during assembly of the active part such that the electric conductors of a respective segment is operable by applying a voltage to the respective segment conductor rail.

5. The method as claimed in claim 4, wherein the respective section conductor rail is connected to the respective segment conductor rail during assembly of the annular active part.

6. The method as claimed in claim 4, wherein the respective section conductor rail is formed as a unitary part with the respective segment conductor rail.

7. The method as claimed in claim 3, wherein the respective segment conductor rail is directly connected to the respective connection point of the electric machine during assembly.

8. The method as claimed in claim 1, wherein the respective electric conductors of at least two different ring-segment-shaped segments are connected together via the respective section conductor rail or via the respective segment conductor rail during assembly of the active part; and wherein the respective section conductor rail or the respective segment conductor rail is connected to a respective connection point of the electric machine during assembly.

9. The method as claimed in claim 1, wherein said providing galvanically separated electric conductors comprises providing at least three galvanically separated electric conductors.

10. The method as claimed in claim 1, wherein the annular active part includes at least four ring-segment-shaped segments.

11. A ring-segment-shaped section surrounded by an annular active part of an electric machine for a mill drive, comprising:

grooves for receiving electric conductors;

at least two galvanically separated electric conductors;

a respective electrically insulating insulation layer which electrically insulates a respective galvanically separated electric conductor; and a respective section conductor rail;

wherein the respective electrically insulating insulation layer of the respective galvanically separated electric conductor is impregnated with an impregnant;

wherein the respective insulated and impregnated galvanically separated electric conductor is arranged in at least two different grooves of the respective ring-segment-shaped section surrounded by the annular active part of the electric machine, extending in opposite directions; and wherein the respective section conductor rail is electrically connected to the respective galvanically separated electric conductor of the respective ring-segment-shaped section before transportation of the respective ring-segment-shaped section such that the respective ring-segment-shaped section is operable by applying a voltage to the respective section conductor rail.

12. The ring-segment-shaped section as claimed in claim 11, wherein the at least two galvanically separated electric conductors are formed such that at least two magnetic poles are formed when a voltage is applied to the respective electric conductor.

13. The ring-segment-shaped section as claimed in claim 11;

wherein the respective galvanically separated electric conductor is configured as a preformed coil; and wherein at least one of (i) at least one electric conductor of the galvanically separated electric conductor is cranked outwards in a radial direction and (ii) at least one of the electric conductors is cranked inwards in the radial direction.

14. The ring-segment-shaped section as claimed in claim 12;

wherein the respective galvanically separated electric conductor is configured as a preformed coil; and wherein at least one of (i) at least one electric conductor of the galvanically separated electric conductor is cranked outwards in a radial direction and (ii) at least one of the electric conductors is cranked inwards in the radial direction.

15. The ring-segment-shaped section as claimed in claim 11, wherein the ring-segment-shaped section includes at least three galvanically separated electric conductors.

16. The ring-segment-shaped section as claimed in claim 12, wherein at least three, magnetic poles are formed when the voltage is applied to the respective electric conductor.

17. An electric machine for a mill drive or a wind power plant, comprising at least one ring-segment-shaped section as claimed in claim 11.

18. A mill or wind power plant comprising the electric machine as claimed in claim 17.

19. A service method for an electric machine including ring-segment-shaped sections surrounded by an annular active part for a mill drive or a wind power plant, comprising:

providing at least one ring-segment-shaped section, in addition to the ring-segment-shaped sections of the electric machine, in a vicinity of an operating location of the electric machine, the at least one additionally provided section being essentially structurally identical to the ring-segment-shaped sections of the electric machine; and if one of the ring-segment-shaped sections of the electric machine exhibits a fault:

removing the faulty ring-segment-shaped section from the electric machine; and installing the at least one additionally provided ring-segment-shaped section within the electric machine.

* * * * *